N. H. FREEMAN.
APPARATUS FOR PURIFYING LIQUIDS OR SEMILIQUIDS.
APPLICATION FILED MAR. 15, 1909.

948,725.

Patented Feb. 8, 1910.
3 SHEETS—SHEET 2.

Witnesses
J. D. Thornburgh
Otto E. Hoddick

Inventor
N. H. Freeman
By
Attorney

UNITED STATES PATENT OFFICE.

NAT H. FREEMAN, OF BOULDER, COLORADO.

APPARATUS FOR PURIFYING LIQUIDS OR SEMILIQUIDS.

948,725.  Specification of Letters Patent.  Patented Feb. 8, 1910.

Application filed March 15, 1909. Serial No. 483,020.

*To all whom it may concern:*

Be it known that I, NAT H. FREEMAN, a citizen of the United States, residing at Boulder, in the county of Boulder and State of Colorado, have invented certain new and useful Improvements in Apparatus for Purifying Liquids or Semiliquids; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for purifying liquids, my invention being more especially intended for use in purifying sewage in cities, whereby it may be sufficiently purified to be discharged into a river or other stream or body of water, without polluting the latter.

The invention consists in the arrangement of a number of tanks, through which the sewage is passed, the same being caused to pass automatically through the series of tanks, provision being made for subjecting it to an aerating process during such passage. Any desired number of tanks may be employed. In each of these tanks atmospheric air is introduced into the sewage, which is thoroughly aerated. By virtue of certain chemical reactions, which take place between the elements of the air and the sewage, the latter is purified, as heretofore indicated.

In carrying out my invention, the sewage is caused to travel from one tank to another, on the suction principle. As soon as any tank is full, a float therein acts upon a rod upon which the float is mounted to actuate a valve, whereby communication between the suction pipe and the tank is cut off and communication between the atmosphere and the bottom of the tank is established. In this event liquid passes out of the tank in question into the next tank which is under suction, while the air entering at the bottom of the tank which is discharging its liquid, passes up through the liquid to fill the vacuum formed by the escaping liquid, with the result that the liquid or semiliquid material within the tank is thoroughly aerated, and this is repeatedly accomplished in a series of tanks, the number being sufficient to purify the liquid for the purpose stated.

Having briefly outlined my improvement, I will proceed to describe the same in detail, reference being made to the accompanying drawing, in which is illustrated an embodiment thereof.

Figure 1:
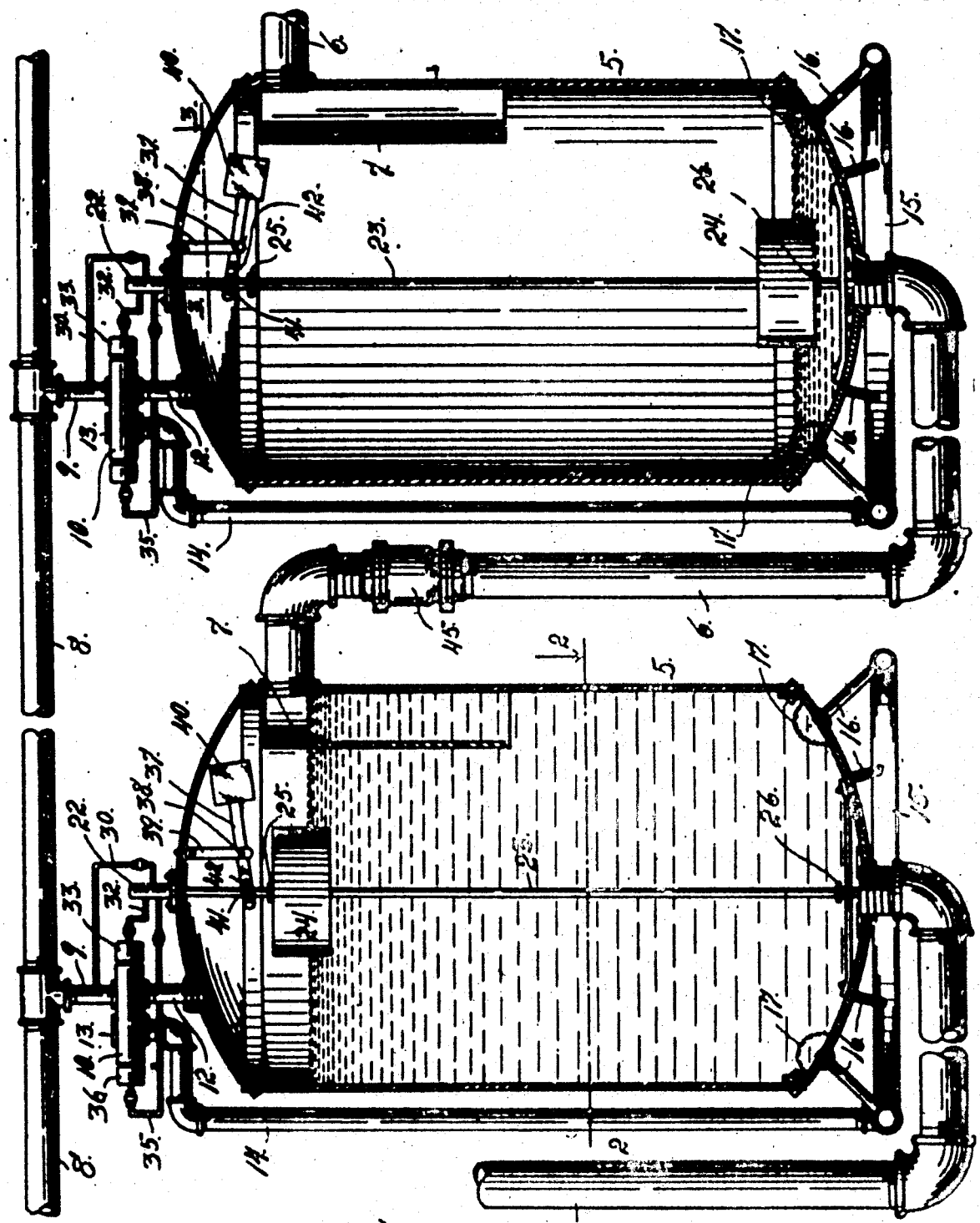
Figure 2:
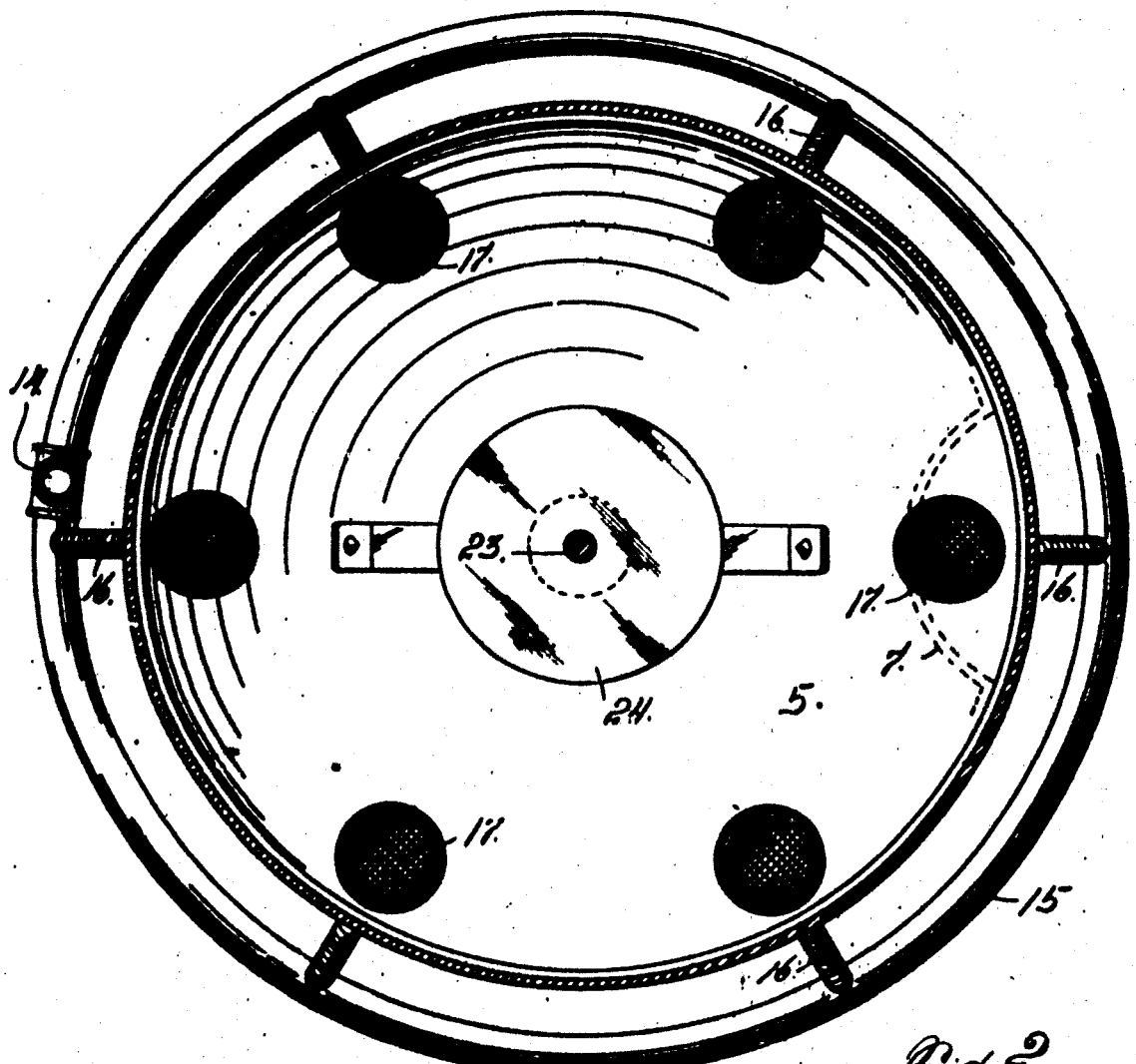
Figure 3:
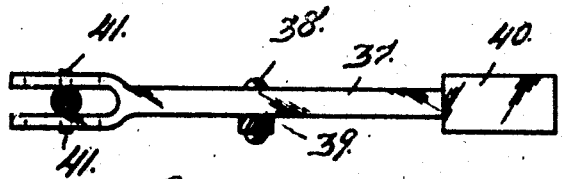
Figure 4:
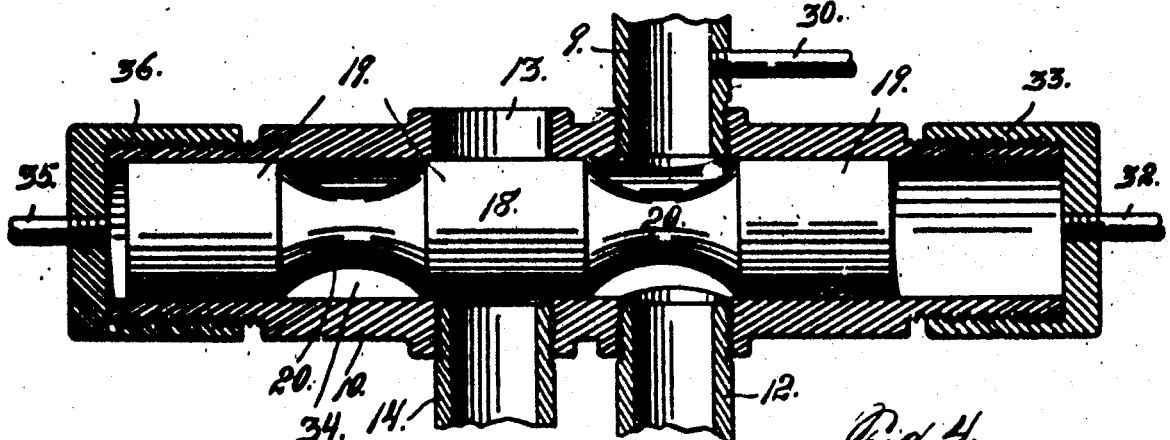
Figure 5:
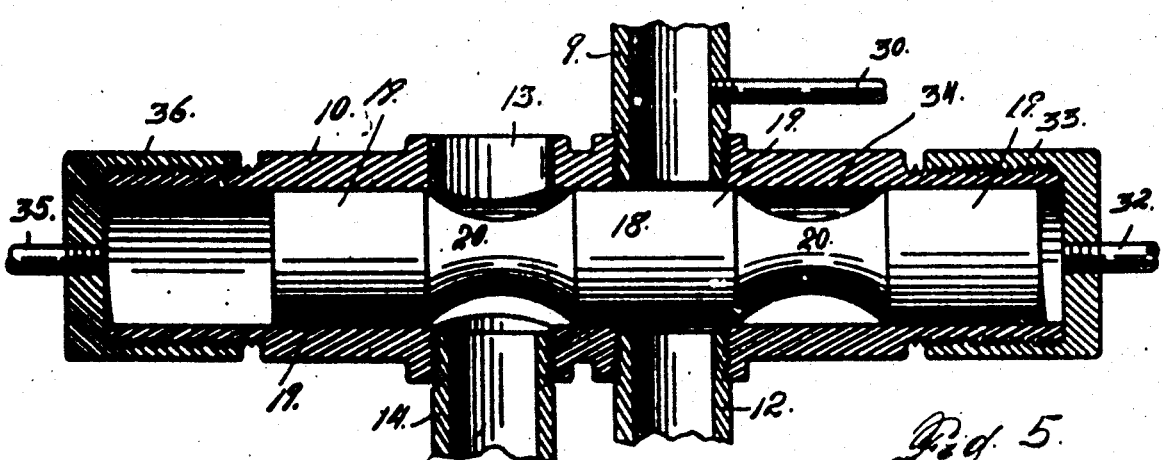
Figures 6, 7:
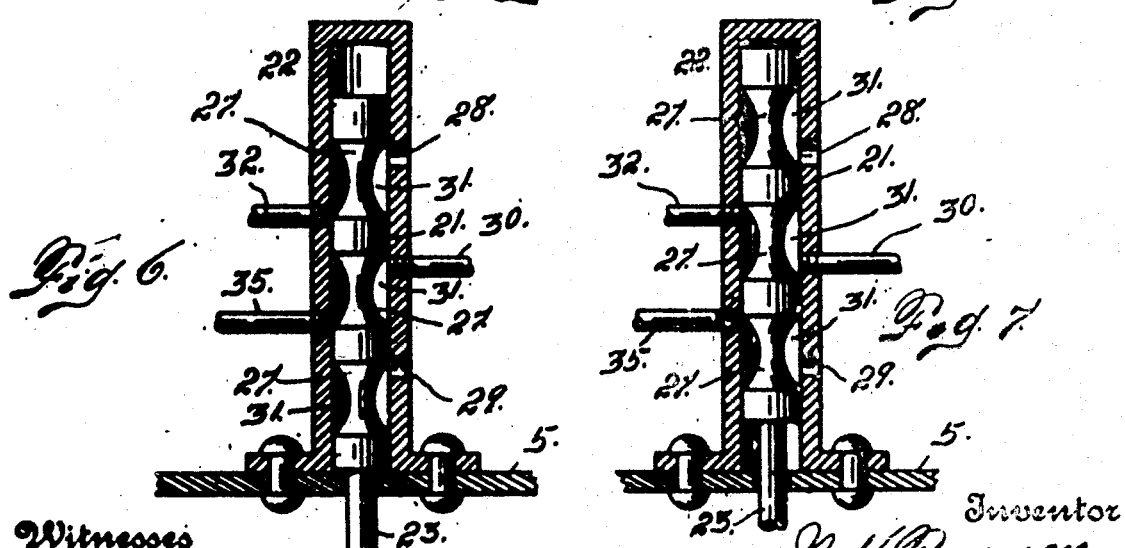

In this drawing Figure 1 is a vertical section taken through two tanks arranged and equipped in accordance with my invention. Fig. 2 is a cross-section taken through one of the tanks on the line 2—2, Fig. 1, shown on a larger scale. Fig. 3 is a section taken on the line 3—3, Fig. 1, looking downwardly and showing the weighted lever in detail, and on a larger scale. Fig. 4 is a longitudinal section taken through the main valve of the apparatus, shown on a larger scale than in Fig. 1. Fig. 5 is a similar view showing the valve in a different relative position. Fig. 6 is a section taken through the casing of the auxiliary valve, the parts being shown on a larger scale than in Fig. 1. Fig. 7 is a similar view, showing the valve in a different relative position.

The same reference characters indicate the same parts in all the views.

Let the numeral 5 designate each of a number of tanks, which, as shown in the drawing, are arranged side by side, occupying the same elevation. The bottom of each of these tanks is connected with the top of the adjacent tank by means of a conduit 6, the upper portion of the tank when it connects with the conduit being equipped with a curved plate 7 arranged directly in front of the open extremity of the conduit, and serving to prevent such agitation in the upper part of the tank as would interfere with the operation of the float within the tank.

Arranged above the series of tanks, is a suction pipe 8, having a branch 9 leading to the main valve casing 10. A branch pipe 12 in alinement with the branch 9, but on the opposite side of the casing, communicates with the top of the tank 5. The casing 10 is also provided with an opening 13 on its upper side. Directly opposite this opening an air pipe 14 is in communication with the casing, the opposite extremity of said air pipe communicating with a circular pipe 15 arranged below the bottom of the tank, and having branch pipes 16 communicating with the bottom of the tank, the openings through which these branch pipes protrude being protected by mesh material, as shown at 17, to prevent the possible clogging of the branch pipes by the settling of solid material therein. Within the valve casing 10 is located the main valve 18, which, as shown in the drawing, is provided with three cylindrical members or portions 19 and two reduced or spool-shaped portions 20.

When the suction pipe 8 is in communication with the tank, the valve 18 is in the position as shown in Fig. 4, whereby one of the spool-like portions of the main valve is brought into position between the openings in the valve casing communicating with the pipes 9 and 12. In this event the tank is cut off from communication with the atmosphere. When, however, it is desired to cut off the tank from communication with the suction conduit and open communication between the tank and the atmosphere, the main valve is shifted to the position shown in Fig. 5. This is accomplished through the agency of an auxiliary valve located in a casing 22 attached to the top of the tank. The valve 21 is connected with the upper extremity of a rod 23 vertically disposed in each tank 5, and upon which a float 24 moves freely between upper and lower stop collars 25 and 26. As the float rises during the filling of the tank, it acts upon the upper stop 25, to shift the valve 21 into the position shown in Fig. 7. This valve is composed of a number of cylindrical members and a number of separating spool-shaped members 27. It is also provided with upper and lower ports 28 and 29, communicating with the atmosphere. A relatively small pipe 30 leads from the branch suction pipe 9 and communicates with the chamber of the valve 21, and when this valve is in the position shown in Fig. 7, being the position which it occupies when the tank is full, communication is opened between one extremity of the main valve chamber and the suction pipe, by way of the small pipe 30, the valve chamber 31 and a pipe 32 which leads from the last named chamber to the extremity 33 of a chamber 34 of the main valve. At the same time, communication is opened between the opposite extremity of the main valve chamber, and the atmosphere, by way of the port 29, the valve chamber 31, and a pipe 35 leading from the last named chamber to the extremity 36 of the main valve casing. When this occurs, the main valve is in the position shown in Fig. 4, but it is immediately shifted to the position shown in Fig. 5, since its movement will be in the direction of the extremity of the valve chamber which is in communication with the suction pipe. When this occurs the tank is cut off from the suction pipe, since one of the cylindrical members 19 of the main valve is brought into position to accomplish this purpose. At the same time, communication is opened between the atmosphere and the bottom of the tank, by way of the port 18, the pipe 14 and the branch pipe 16. The liquid will then begin to pass out of the full tank into the adjacent tank, through the pipe 6, the air rising through the liquid and entering the top of the tank to prevent the formation of a vacuum due to the escape of the liquid. When the tank is substantially emptied, its float, which has followed the rod 23 downwardly to harmonize with the level of the liquid, acts upon the lower stop 26, and shifts the rod 23, whereby the position of the valve 28 is changed from that shown in Fig. 7 to that shown in Fig. 6. When this occurs the extremity 36 of the main valve chamber will be placed in communication with the suction pipe, by way of the pipe 30, the auxiliary valve chamber 31, and the pipe 35. At the same time, the opposite extremity 33 of the main valve chamber is placed in communication with the atmosphere, by way of the port 28, the valve chamber 31 and the pipe 32, thus causing the main valve to move from right to left, whereby it is shifted from the position shown in Fig. 5 to the position shown in Fig. 4, thus opening communication between the top of the tank and the suction pipe, and cutting off communication between the tank and the atmosphere. In this event, the tank begins to fill either by the discharge from an adjacent tank or from the main source of liquid supply, as the case may be, depending upon whether the tank in question is the initial or intermediate tank of the series.

In order to facilitate the operation of the valve 21, a lever 37, fulcrumed at 38 on a depending bracket 39, is employed. The free extremity of this lever is equipped with a weight 40, while its opposite extremity is bifurcated to straddle the rod 23 and slotted to receive pins 41 which pass through slots 42, with which the arms of the bifurcated extremity of the lever are provided. When the float is at its upward limit of movement, and has shifted the rod to throw the valve 21 to the position shown in Fig. 7, the lever 37 is also actuated, being caused to occupy the position shown in the tank at the right of Fig. 1, the weight serving to maintain the valve in this position against accidental displacement. On the contrary, when the liquid in the tank has reached its lowest level, the float 24 acts upon the lowermost stop 26, to shift the rod 23, to reverse the position of the lever 37, whereby it is caused to occupy the position shown at the left of Fig. 1. It may be stated that the position of the weighted lever in the tank at the left of Fig. 1, is that which it occupies when the tank is empty, since the float 24 in this particular tank has not quite reached the necessary height to shift the valve, but is just in engagement with the stop-collar 31 when the upward movement of the rod commences. It may also be stated that the position of the weighted lever in the tank at the right of Fig. 1 is that which it occupies after the rod has been moved upwardly by the upward movement of the float. From this it will be understood that the float in the tank at the right of Fig. 1 has just come into engagement with the lower stop-collar 26, and as the balance of the liquid leaves this tank, the weight of the float will act upon the rod to shift the weighted lever, and also operate the valve 26 to open communication between the suction pipe and the tank through the agency of the main valve 18.

From the foregoing it will be understood, assuming that the initial tank of the series is in communication with a suitable source of liquid supply, that the said liquid may be taken from said source and passed successively and automatically through all of the tanks of the series, whereby it is subjected to the process of aeration, as heretofore described, in each tank, resulting in the purification of the liquid for the purpose stated.

Each pipe 6 leading from the bottom of one tank to the upper portion of an adjacent tank, is provided with an upwardly opening check valve 45, to prevent the downflow of the liquid through the said pipe when the tank next in the rear is under suction or during its filling operation. The term rear in the sense here used, indicates the direction toward the source of liquid supply. This valve 45 opens upwardly readily in response to suction in the tank with which its upper extremity is connected, but closes by a downward movement when the rear tank is under suction, as just explained.

I claim—

1. Means for purifying liquids, comprising a tank whose upper portion is connected with a source of liquid supply, the bottom of the tank having an outlet, a float in the tank, suction means, a main valve, an auxiliary valve controlled by the float, a pipe connected at one extremity with the main valve casing between its ends and at its opposite extremity of the bottom of the tank, another pipe leading from the main valve casing between its extremities to the top of the tank, a third pipe connecting the main valve casing between its extremities with the suction means, a connection between the third pipe and the auxiliary valve casing, and between the last named casing and the opposite extremities of the main valve casing, the auxiliary and main valve casing having ports communicating with the atmosphere, the arrangement being such that as the auxiliary valve is moved in opposite directions, the opposite extremities of the main valve casing are alternately placed in communication with the suction means and the atmosphere, whereby the main valve is shifted in one direction to open communication between the bottom of the tank and the atmosphere and cut off communication between the top of the tank and the suction means, and in the opposite direction to cut off communication between the bottom of the tank and the atmosphere and open communication between the top of the tank and the suction means.

2. Means for purifying liquids by aeration, comprising a number of tanks, the upper portion of the initial or first tank being in communication with a source of liquid supply, the bottom of any tank being in communication with the upper portion of the adjacent tank, a float in each tank, suction means, a main valve for each tank, an auxiliary valve for each tank controlled by the float, a pipe connected at one extremity with each main valve casing between its extremities, the opposite extremity of said pipe being in communication with the bottom of the tank, another pipe leading from the main valve casing between its extremities to the top of the tank, a third pipe connecting the main valve casing between its extremities with the suction means, a connection between the third pipe and the auxiliary valve casing; and between the last named casing and the opposite extremity of the main valve casing, the auxiliary and main valve casings having ports communicating with the atmosphere, the arrangement being such that as the auxiliary valve is moved in opposite directions, the opposite extremities of the main valve casing are alternately placed in communication with the suction means and with the atmosphere whereby the main valve is shifted in one direction to open communication between the bottom of its tank and the atmosphere and cut off communication between the top of its tank and the suction means, and in the opposite direction to cut off communication between the bottom of the tank and the atmosphere and to open communication between the top of the tank and the suction means, the communication between the bottom of the one tank and the upper portion of the adjacent tank, being interrupted, the arrangements of the valves of the two tanks being such that when one tank is in communication with the atmosphere, the other tank is in communication with the suction means.

3. Means for purifying liquids by aeration comprising a tank having an inlet at the top and an outlet at the bottom, a float within the tank, suction means, an auxiliary valve controlled by the float, in communication with the suction means and with the atmosphere, and whose opposite ends are connected with the auxiliary valve, the arrangement being such that when the auxiliary valve is moved in one direction, the main valve is shifted to open communication between the top of the tank and the suction means, and when the auxiliary valve is moved in the opposite direction the air is cut off from the tank and the latter placed in communication with the suction means.

In testimony whereof I affix my signature in presence of two witnesses.

NAT H. FREEMAN.

Witnesses:
A. J. O'BRIEN,
A. EBERT O'BRIEN.